Dec. 11, 1951     H. M. ORR     2,578,261

INTERNAL THREAD GAUGE

Filed Oct. 2, 1947

INVENTOR.

Harold M. Orr

BY *Victor J. Evans & Co.*

ATTORNEYS

Patented Dec. 11, 1951

2,578,261

UNITED STATES PATENT OFFICE 2,578,261

INTERNAL THREAD GAUGE

Harold M. Orr, Glendale, Calif.

Application October 2, 1947, Serial No. 777,397

1 Claim. (Cl. 33—199)

My present invention relates generally to geometrical instruments of the opposed contacts class for accurately measuring the pitch diameter of internal threads, and more specifically to an improved internal thread gauge of the manually adjusted wedge type for co-action with a micrometer, and the gauge, while well-adapted for various purposes and uses, is especially designed for machine shop practice in measuring work while retained on the lathe, or on a thread mill, as well as for measuring finished products. The gauge of my invention provides an instrument whereby the machinist may readily set up his lathe, or adjust a thread mill, for cutting threads, and thereafter accurately perform the precise steps for production of the finished article or work. The novel gauge includes a minimum number of parts that may with facility be manufactured at a low cost of production, and assembled with convenience to constitute a precision instrument that may be manipulated quickly and with ease for measuring operations.

The invention consists in certain novel features of construction and combinations and arrangements of parts as will hereinafter be described, and more particularly set forth in the appended claim.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures within the scope of my claim without departing from the principles of the invention.

Figure 1:
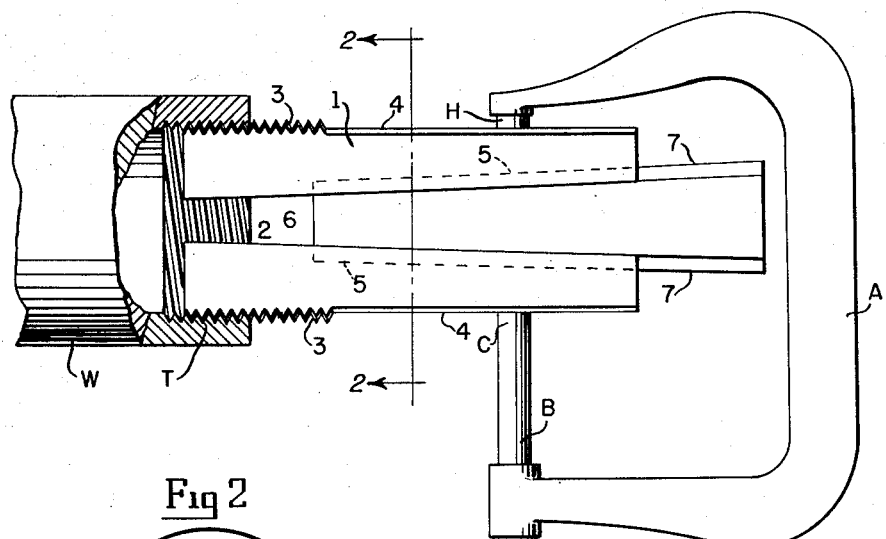
Figure 1 is a view in side elevation of the gauge of my invention, employed with a conventional micrometer, and showing in partial section an internally threaded cylinder to which the instrument is applied.
Figure 2:
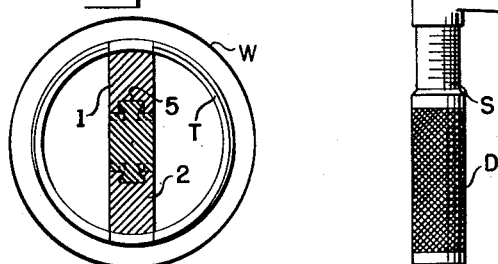
Figure 2 is a transverse sectional view through the gauge as at line 2—2 of Fig. 1.
Figure 3:
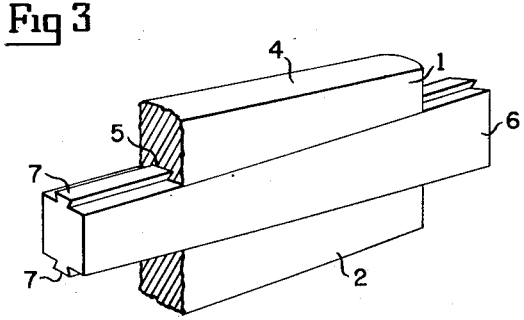
Figure 3 is a perspective view showing portions of the expansible adjustable anvils, and the spreader or wedge therefor.

The gauge, as shown in Fig. 1 is adapted for use with a conventional micrometer including a yoke A having a fixed contact head H and an adjustable screw bar B provided with a complementary opposed and movable contact C, and the adjusting screw bar, which is provided with a handle D is equipped with a usual micrometer or graduated scale S, for accurately measuring and indicating the pitch diameter of the internal threads T of the cylindrical tube or work W.

In carrying out my invention I utilize two flat duplex and opposed gauge arms or anvils 1 and 2, preferably of hardened steel, and each anvil is precision ground to form external screw threads 3 at one end, and the exterior edges 4, 4 of these anvils are ground to smooth surfaces that gauge the pitch diameter of the internal threads of the work.

The inner adjoining edges of the anvils are preferably fashioned on diagonal, oblique, or inclined planes converging toward the front ends of the anvils, and each of these adjoining edges is fashioned with longitudinally extending dovetail grooves, as 5 and 5.

For expanding the anvils a slidable spreader, or wedge 6 is mounted between the adjoining edges of the anvils, and the spreader or wedge is fashioned on its converging edges with longitudinally extending dove-tail tongues 7, 7 that are slidably engaged in the complementary grooves of the anvils.

In actual practice, as indicated in Fig. 1, the loosely contracted gauge is inserted within the internally threaded work W, and then the wedge shaped spreader is manually forced between the anvils to spread the threads 3, 3 into snug engagement with the internal threads T. Then the screw bar B of the micrometer is adjusted to set the two contacts C and H on the complementary gauging surfaces 4, 4, of the anvils; and the pitch diameter of the internal threads will be measured and indicated by the scale S of the micrometer.

The gauge here illustrated and described may be one of a set of instruments, in which each instrument consists of duplex anvils having threads ground to various desirable sizes, and also an interchangeable spreader or wedge, with the wedges ground to desired sizes within a suitable range of maximum and minimum measurements, and the parts may be interchanged by the machinist or craftsman for measuring various types of work.

Having thus fully described my invention, what I claim and desire to secure by Letters Patent is:

In an adjustable gauge for measuring the diameter of internal threads, the combination of a spreader having converging edges, a pair of anvils having inclined surfaces adapted to ride on said spreader edges, dove-tail groove means on the inner edges of said anvils and dove-tail tongue means on the opposite edges of said spreader and said dovetail tongue and groove means retaining one on the other, each said anvil having a screw threaded feeler portion adapted to engage the internal threads and an arcuate smooth portion adapted to be engaged by a measuring device for determining the distance between said arcuate smooth portions, said gauge being adapted to be inserted into a hollow member having internal threads so that the screw threaded portions of the anvils will engage the internal threads of the hollow member whereby when said spreader is moved toward the member moving said anvils against the threads, the distance between said arcuate smooth portions will represent the diameter of the internal threads.

HAROLD M. ORR.

REFERENCES CITED

The following references are of record in the file of this patent:

UNITED STATES PATENTS

| Number | Name | Date |
| --- | --- | --- |
| 833,598 | Hansen | Oct. 16, 1906 |
| 1,478,541 | Bath | Dec. 25, 1923 |
| 1,509,578 | Bath | Sept. 23, 1924 |
| 1,595,368 | Volis | Aug. 10, 1926 |

FOREIGN PATENTS

| Number | Country | Date |
| --- | --- | --- |
| 49,000 | Sweden | Apr. 20, 1921 |
| 263,360 | Germany | Aug. 7, 1913 |

OTHER REFERENCES

Publication: "Herlth Adjustable Parallel Gauges," The O. B. Herlth Mfg. Co., Inc., 272 Tolland St., E. Hartford, Conn.